United States Patent Office 3,365,215
Patented Jan. 23, 1968

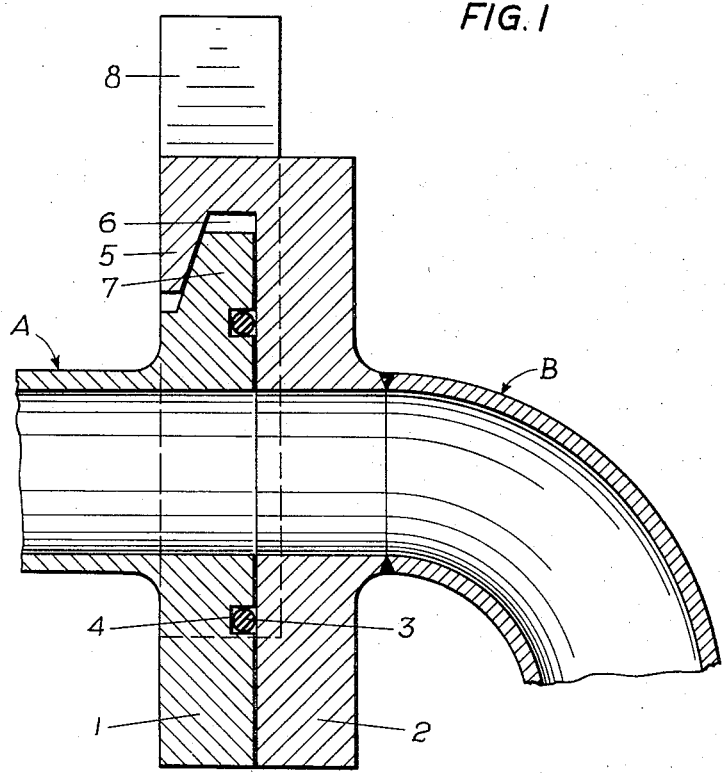

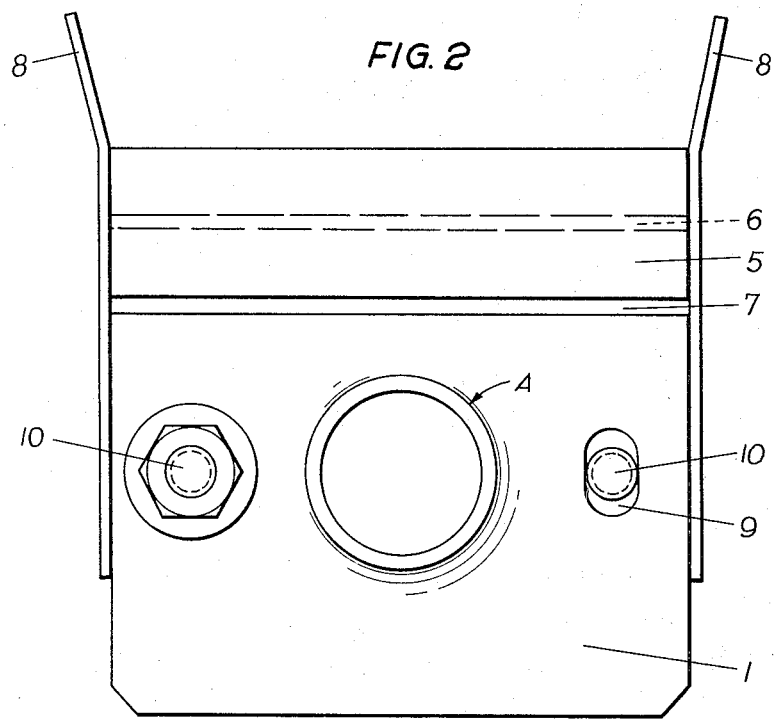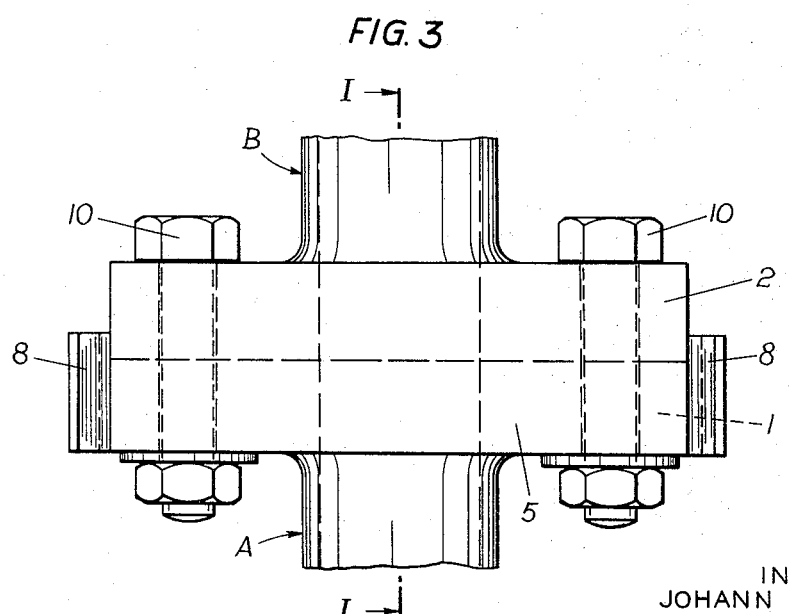

3,365,215
PIPE OR TUBE CONNECTION
Johann Arzt and Alfred Enenkel, Linz, Austria, assignors to Vereinigte Osterreichische Eisen- und Stahlwerke Aktiengesellschaft, Linz, Austria, an Austrian company
Filed Jan. 9, 1967, Ser. No. 608,072
Claims priority, application Austria, Feb. 1, 1966, A 878/66
1 Claim. (Cl. 285—24)

ABSTRACT OF THE DISCLOSURE

A pipe coupling characterized by a pair of rectangular flanges, one of the flanges having a hook-shaped portion with a tapered groove in it for receiving a key portion on the other flange portion of a shape complemental of the groove so that the key portion can be inserted endwise into the groove to bring the flanges together and clamp a gasket between them, one of the flange members being provided with edge guides or bars having diverging portions disposed outwardly of the periphery of the flange to guide the flanges into engagement by a straight line movement, the flanges further being held together by means of bolts engaging in oblong holes in the flanges to enable proper mating and adjustment of the flanges.

---

The invention relates to a pipe or tube connection or coupling comprising flanges, which encase a packing between them and can be drawn together by means of screws, so as to exercise the necessary pressure upon the packing.

With known pipe connections or couplings, problems associated with the diameter of the pipe will often arise. Screw couplings cannot be used with pipes or tubes having a larger diameter; the same applies to couplings having catch grooves, which, besides, are not protected against turning in and out. The generally used slotted flange couplings, which are independent of dimension, are of disadvantage in that they need many holes for the fixing screws. As a result the screw holes have to be accurately aligned after inserting and adjusting of the packing, and only then the screws can be mounted and tightened.

For various purposes it is essential to establish an easily detachable yet tight connection between pipes or tubes, which, after an eventual detachment, can quickly be re-assembled. This is the case, e.g., when connecting oxygen lances for carrying out oxygen top-blowing processes, where, when a lance fails, a new lance has to be mounted in very short time, or where, e.g., when a feed-pipe for lime-carrying oxygen is blocked up, it has to be exchanged against another in order to be able quickly to resume operation.

The present invention has as its object to provide a connection for pipes or tubes, which enables easy detachability and exchangeability of the connecting parts, while at the same time guaranteeing a high working reliability. The pipe or tube connection of the invention comprising two flanges, which encase a packing and can be drawn together by means of screws so as to exercise the necessary pressure upon the packing, is characterised in that one of the flanges overlaps the other with a hook-shaped portion, a wedge-shaped groove being provided in the hook-shaped portion, into which groove the other flange engages with a corresponding wedge-shaped key portion.

Suitably, one of the two flanges has guide-means for the other flange, preferably slide bars extending perpendicularly of the groove along the side edges.

The flanges are preferably drawn together by only two screw bolts penetrating oblong holes, the longitudinal direction of which is vertical to the direction of the groove.

As packing between the flanges, a round rubber packing may be provided, which is inserted into an annular groove in one of the flanges.

The invention is illustrated in the drawing by way of an embodiment. FIG. 1 shows a cross-section through a pipe or tube connection according to the invention, FIG. 2 is a top view, and FIG. 3 the corresponding lateral view. The pipes A and B, which are to be connected, have flanges 1 and 2, respectively, a packing being encased between them. As packing, a round rubber packing 3 is used, which is inserted into a ring groove 4 of the flange 1. The pipe section A with flange 1 may, e.g., be the end part of an oxygen lance, pipe portion B with flange 2 the quadrant-pipe end part of the oxygen supply pipe.

According to the invention, flange 2 has a hook-shaped appendix 5 overlapping flange 1. A wedge-shaped groove 6 is provided in the hook-shaped part, with which groove the correspondingly wedge-shaped portion 7 of flange 1 engages.

As shown in FIG. 2, the flanges have approximately rectangular shape. One of the two flanges, suitably flange 2, is provided with guide or slide bars 8 fixed to the two side edges, e.g., welded or screwed on. Both flanges are further provided with two oblong holes 9, the longitudinal direction of which is vertical to the longitudinal wedge-groove direction. These holes are penetrated by screw bolts 10.

The function of the pipe connection according to the invention is the following: After inserting the rubber packing 3 into the ring groove 4 during mounting, the hook-shaped appendix 5 of flange 2 is stuck over the wedge-shaped portion 7 of the flange 1, both portions being guided by the slide bars 8, thus rendering any centering work unnecessary. The two screws 10 are introduced into the oblong holes 9 and tightened. Due to the wedge effect of flange portion 7 in the groove 6, the necessary pressure is exercised upon the packing 3.

The coupling according to the invention enables very quick mounting. Detaching of the coupling is also very easy. The coupling according to the invention may be used for pipes of any diameter. Insertion of the packing requires no fitting work; the screw holes do not have to be aligned because, in connection with the slide bars, they are self-centering. Due to the wedge effect, a high pressure resistance is achieved. The pipe or tube connection of the invention is thus usable for liquid and gaseous media which are subjected to high pressure.

What we claim is:
1. A pipe connection comprising two substantially rectangular pipe flanges having substantially mating planar faces, means for receiving a packing between said planar faces of said flanges and a packing element received in said means, a hook-like portion on one of said flanges having a wedge-shaped groove therein, a complemental key-like portion on the other flange engageable in said groove, slide bars secured to and extending along two opposite side edges and extending axially beyond the planar face of one of said flanges and having diverging portions extending radially outwardly of said flange to guide said key-like portion into said groove and center said one and other flanges, oblong holes in said flanges having the longest dimension perpendicular to said groove and bolts extending through said holes to clamp said flanges and said packing element sealingly together.

(References on following page)

References Cited

UNITED STATES PATENTS

| | | | |
|---|---|---|---|
| 1,067,514 | 7/1913 | Freeman | 285—283 X |
| 1,493,221 | 5/1924 | Northrup | 285—283 X |
| 2,452,430 | 10/1948 | Clark et al. | 285—283 X |
| 2,517,391 | 8/1950 | Ernestus | 285—368 X |
| 2,643,139 | 6/1953 | Hamilton | 285—27 |
| 2,859,052 | 11/1958 | Corbeels et al. | 285—368 X |
| 3,065,000 | 11/1962 | Stanton | 285—368 X |
| 3,260,539 | 7/1966 | Herron | 285—24 |

FOREIGN PATENTS 684,043  3/1930  France.

CARL W. TOMLIN, *Primary Examiner.*

D. W. AROLA, *Assistant Examiner.*